(12) United States Patent
Klassen et al.

(10) Patent No.: US 7,277,719 B2
(45) Date of Patent: Oct. 2, 2007

(54) SYSTEM AND METHOD OF MESSAGE TRANSPORT SELECTION

(75) Inventors: Gerhard D. Klassen, Waterloo (CA); David P. Yach, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 145 days.

(21) Appl. No.: 10/860,386

(22) Filed: Jun. 3, 2004

(65) Prior Publication Data

US 2007/0112915 A1   May 17, 2007

(30) Foreign Application Priority Data

Jun. 4, 2003  (GB)  ................................. 0312817.0

(51) Int. Cl.
*H04Q 7/20* (2006.01)
(52) U.S. Cl. ................. 455/466; 455/412.1; 455/412.2; 455/414.4; 455/432; 455/450; 455/464; 455/552.1; 455/556.1; 455/556.2; 709/206; 709/227; 709/238; 715/751; 715/752
(58) Field of Classification Search ............. 455/412.1, 455/412.2, 414.4, 432, 450–452.1, 466, 464, 455/552.1, 556.1, 556.2; 709/206, 227, 238; 715/751, 752
See application file for complete search history.

(56) References Cited

U.S. PATENT DOCUMENTS

| | | | | |
|---|---|---|---|---|
| 5,436,960 A | * | 7/1995 | Campana et al. | ........ 455/412.1 |
| 5,446,759 A | * | 8/1995 | Campana, Jr. | ............ 375/267 |
| 6,185,603 B1 | * | 2/2001 | Henderson et al. | ......... 709/206 |
| 6,975,876 B1 | * | 12/2005 | Cast et al. | ................... 455/466 |
| 2002/0086672 A1 | * | 7/2002 | McDowell et al. | ......... 455/432 |
| 2002/0116499 A1 | * | 8/2002 | Enns et al. | ................. 709/227 |
| 2002/0174248 A1 | * | 11/2002 | Morriss | ...................... 709/238 |
| 2002/0198946 A1 | | 12/2002 | Wang et al. | |
| 2003/0101343 A1 | * | 5/2003 | Eaton et al. | ................ 713/170 |
| 2003/0112767 A1 | * | 6/2003 | Meier | .......................... 370/256 |
| 2004/0157590 A1 | * | 8/2004 | Lazaridis et al. | ........... 455/415 |
| 2005/0193345 A1 | * | 9/2005 | Klassen et al. | .............. 715/751 |

FOREIGN PATENT DOCUMENTS

| | | |
|---|---|---|
| DE | 101 27 360 A1 | 12/2002 |
| EP | 1 104 964 A1 | 6/2001 |
| GB | 2363690 * | 1/2002 |
| GB | 2363690 A | 1/2002 |
| WO | WO03/021900 A1 | 3/2003 |
| WO | WO-03021900 * | 3/2003 |

* cited by examiner

*Primary Examiner*—Steve M. D'Agosta
(74) *Attorney, Agent, or Firm*—Dimock Stratton LLP; Jenna L. Wilson

(57) ABSTRACT

A method and system of message transport selection for a communication device configured for communication over a plurality of message transports are provided. A determination is made as to whether any of the plurality of message transports is available for sending an outgoing message from the communication device. One of the available message transports is then selected, and the outgoing message is sent from the communication device using the selected message transport. Even though the outgoing message may be of a message type associated with one of the plurality of message transports, other message transports may be selected and used to send the outgoing message from the communication device.

7 Claims, 5 Drawing Sheets

SYSTEM AND METHOD OF MESSAGE TRANSPORT SELECTION

CROSS-REFERENCE TO RELATED APPLICATION

The present invention claims the priority of Great Britain Patent Application No. 0312817.0, filed on 4 Jun. 2003, the contents of which are incorporated herein by reference.

BACKGROUND

1. Field of the Invention

This invention relates generally to the field of electronic messaging, and in particular to selecting a message transport for transmitting a message.

2. Description of the Related Art

In so-called "instant messaging", short messages are exchanged between users of computer systems or devices connected to a common messaging system or server. Although implementation of instant messaging for computer systems with wired connections to instant messaging systems is known, support for instant messaging on wireless mobile communication devices ("mobile devices") presents several challenges. For example, wireless communication links tend to be much less stable and reliable than wired connections. A mobile device may be moved outside a coverage area of a wireless communication network, in which case a communication link is lost, or between different coverage areas or networks that support different types of links and services, such as both data and voice services or voice services only. Therefore, even though a user of such a device may wish to take advantage of such benefits of instant messaging as a simplified view of messages, known systems support instant messaging only while the mobile device maintains a connection to an instant messaging system. Other types of messaging are similarly dependent upon the availability of a particular message transport or communication scheme.

SUMMARY

According to one aspect of the invention, a message transport selection system for a communication device comprises a plurality of messaging modules, each messaging module associated with one of a plurality of message transports, comprising a multiple-transport messaging module configured to determine whether any of the plurality of message transports is available, to select one of the available message transports where any of the plurality of message transports is available, and to send an outgoing message from the communication device using the selected message transport.

A method of message transport selection for a communication device configured for communication over a plurality of message transports is also provided in accordance with another aspect of the invention. The method includes the steps of detecting an outgoing message to be sent from the communication device, the outgoing message being of a message type associated with one of the plurality of message transports, determining which of the plurality of message transports is available, selecting one of the available message transports, and sending the outgoing message from the communication device using the selected message transport.

DETAILED DESCRIPTION

As described above, known instant messaging systems support instant messaging between users of devices or systems connected to a common server. Maintaining this connection remains a challenge for instant messaging in mobile devices. Other types of messaging systems dependent upon a particular message transport present similar challenges.

Figure 1:
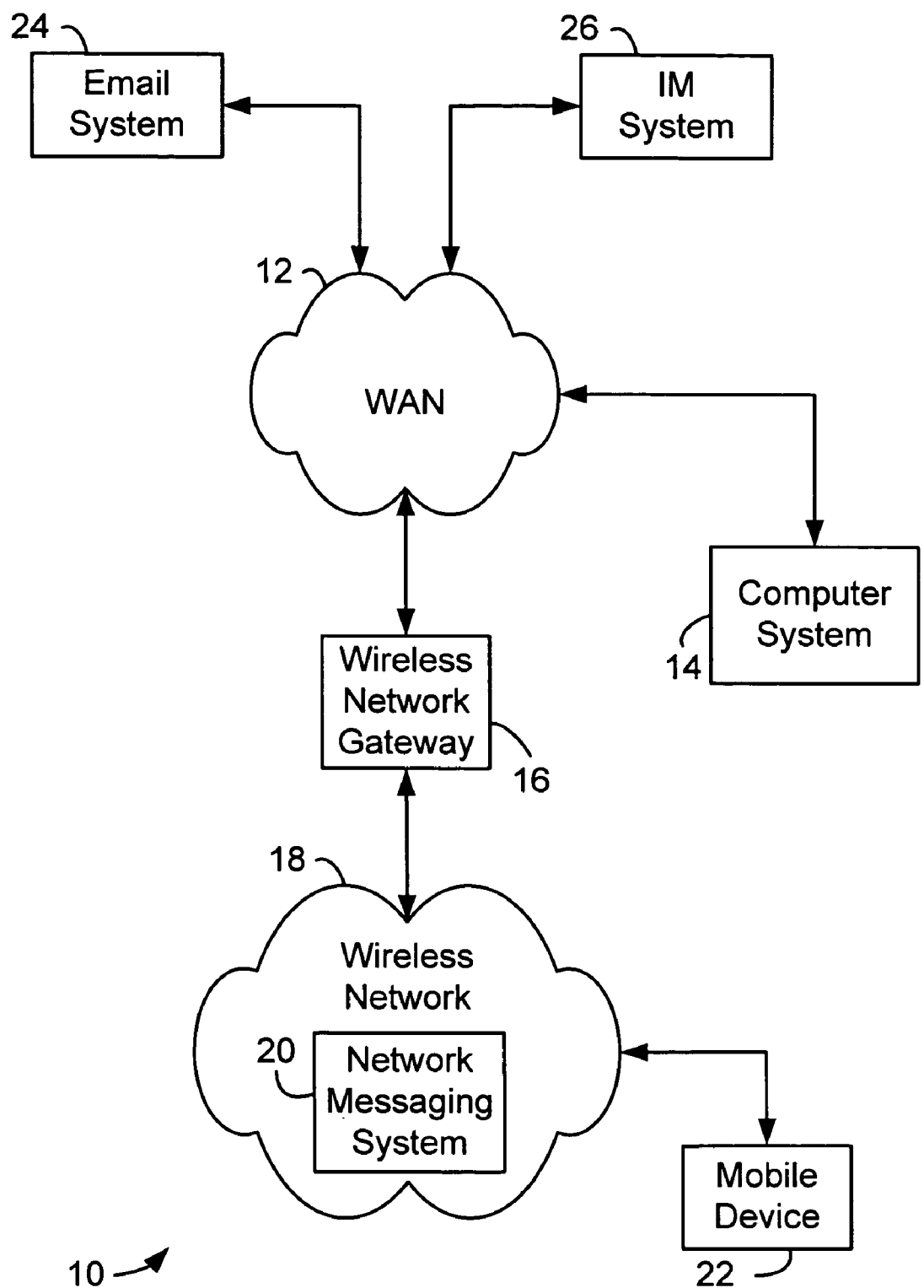
FIG. 1 is a block diagram of a communication system.

Mobile devices are often configured to support several different types of communication functions. For example, dual-mode mobile telephones support both voice and data communications. Many mobile data communication devices and dual-mode mobile devices are similarly enabled for more than one type of data communication service, such as electronic mail (email) and instant messaging. FIG. 1 is a block diagram of a communication system, in which email, instant messaging, and wireless network messaging are provided.

The communication system 10 includes a Wide Area Network (WAN) 12, connected to a computer system 14, a wireless network gateway 16, an email system 24, and an instant messaging (IM) system 26. The wireless network gateway 16 is also connected to a wireless communication network 18, in which a mobile device 22 is configured to operate. The wireless network 18 includes a network messaging system 20.

The computer system 14 is a desktop or laptop personal computer (PC) configured to communicate with other systems and devices over the WAN 12, the Internet, for example. PCs such as the computer system 14 normally access the Internet through an Internet Service Provider (ISP), an Application Service Provider (ASP), or the like.

The email system 24 supports email messaging between users having accounts and mail stores associated with the email system 24 and users having accounts and mail stores associated with the same or another email system (not shown) with which the email system 24 can communicate, typically through the Internet. In one common email system implementation, users access email accounts and mail stores on an email server using an email client to send and retrieve email. Two known email servers are Microsoft™ Exchange server and Lotus Domino™ server, which are configured for user access through Microsoft Outlook and Lotus Notes. These servers are often used in conjunction with Internet mail routers to route and deliver mail messages. Such message servers may also provide additional functionality, including dynamic database storage for calendars, to do lists, task lists, e-mail, electronic documentation, etc.

The IM system 26 provides instant messaging capabilities for transferring messages between users of systems or devices that are connected thereto, also typically through the Internet. Each user has an account associated with the IM system 26 and normally logs in to the account on the IM system 26 to establish a connection. Instant messaging, as its name implies, does not store and then forward messages to users when they connect to the IM system 26. Users must be connected at the same time in order to exchange messages. Presence information is distributed between IM users so that each user is aware of the connection status of a list of users for which IM has been enabled, generally referred to as a "quick list" or "buddy list".

The wireless network gateway 16 provides an interface to the wireless network 18, through which communication signals, including data and possibly voice communication signals, are exchanged with the mobile device 22. Such functions as addressing of the mobile device 22, encoding or otherwise transforming messages for wireless transmission, and any other interface functions, if any, are performed by the wireless network gateway 16. The wireless network gateway 16 may be configured to operate with more than one wireless network 18, in which case the wireless network gateway 16 may also determine a most likely network for locating a given mobile device user and track users as they roam between countries or networks. Any computer system such as 14 with access to the WAN 12 may exchange data with a mobile device 22 through the wireless network gateway 16. Although only a single wireless network gateway 16 is shown in FIG. 1, the wireless network 18 may operate in conjunction with more than one wireless network gateway, including both public gateways such as 16 and private gateways implemented in secure corporate Local Area Networks (LANs) connected to the WAN 12, for example.

The wireless network 18 normally exchanges communication signals with mobile devices such as 22 via RF transmissions between base stations and mobile devices. The wireless network 18 may, for example, be: (1) a data-centric wireless network, (2) a voice-centric wireless network, or (3) a dual-mode network that can support both voice and data communications over the same infrastructure. Recently developed dual-mode wireless networks include: (1) the Code Division Multiple Access (CDMA) network, (2) the Groupe Special Mobile or the Global System for Mobile Communications (GSM) and the General Packet Radio Service (GPRS) networks, and (3) third-generation (3G) networks, such as Enhanced Data rates for Global Evolution (EDGE) and Universal Mobile Telecommunications Systems (UMTS), which are currently under development. GPRS is a data overlay on the existing GSM wireless network, which is used in many parts of the world. Examples of data-centric networks include: (1) the Mobitex™ Radio Network ("Mobitex"), and (2) the DataTAC™ Radio Network ("DataTAC"), and known voice-centric networks include Personal Communication Systems (PCS) networks and Time Division Multiple Access (TDMA) systems.

In the wireless network 18, the network messaging system 20 supports messaging between mobile devices. The Short Message Service (SMS), in which text messages are transmitted between mobile devices based on device telephone number, is an example of one type of wireless network messaging supported by the network messaging system 20 where the wireless network 18 is a GSM network. However, it should be appreciated that the network messaging system 20 may also or instead support other types of device-to-device messaging in the wireless network 18, using Internet Protocol (IP) addresses in an IP-based wireless network, for example.

The mobile device 22 is a data communication device, a voice communication device such as a mobile telephone with data communications functionality, or a multiple-mode device capable of voice, data and other types of communications. An exemplary mobile device 22 is described in further detail below.

As will be apparent from FIG. 1, multiple message transports are available to the mobile device 22. Provided the mobile device 22 is suitably configured with appropriate software and services, data exchange may be accomplished through the network messaging system 20, the email system 24, or the IM system 26. However, as the mobile device 22 moves in and out of coverage of the wireless network 18, or between different wireless networks, not all of the message transports may remain available. For example, if the mobile device 22 moves from a GPRS data network to a GSM-only voice network, then the network messaging system 20 may be available, but any data connection to the IM system 26 is lost, and an instant message exchange or "chat" is interrupted. Similarly, when the mobile device 22 is outside a coverage area of the wireless network 18 and cannot roam onto another network, no connection to the IM system 26 can be established and instant messaging is unavailable. In this instance, a store-and-forward messaging transport associated with the email system 24, for example, may be available, in that email messages can be composed and stored at the mobile device 22 for transmission to the email system 24 and delivery to addressed email recipients when the mobile device 22 returns to wireless network coverage. In accordance with an aspect of the invention, the mobile device 22 is configured to select between a plurality of message transports. In this manner, a messaging function for which a normal or default message transport is not currently available remains usable at the mobile device 22. A messaging function that is typically dependent upon a particular message transport is thereby made independent of the transport, in that alternate available transports can be selected, as described in further detail below.

Figures 2, 3:
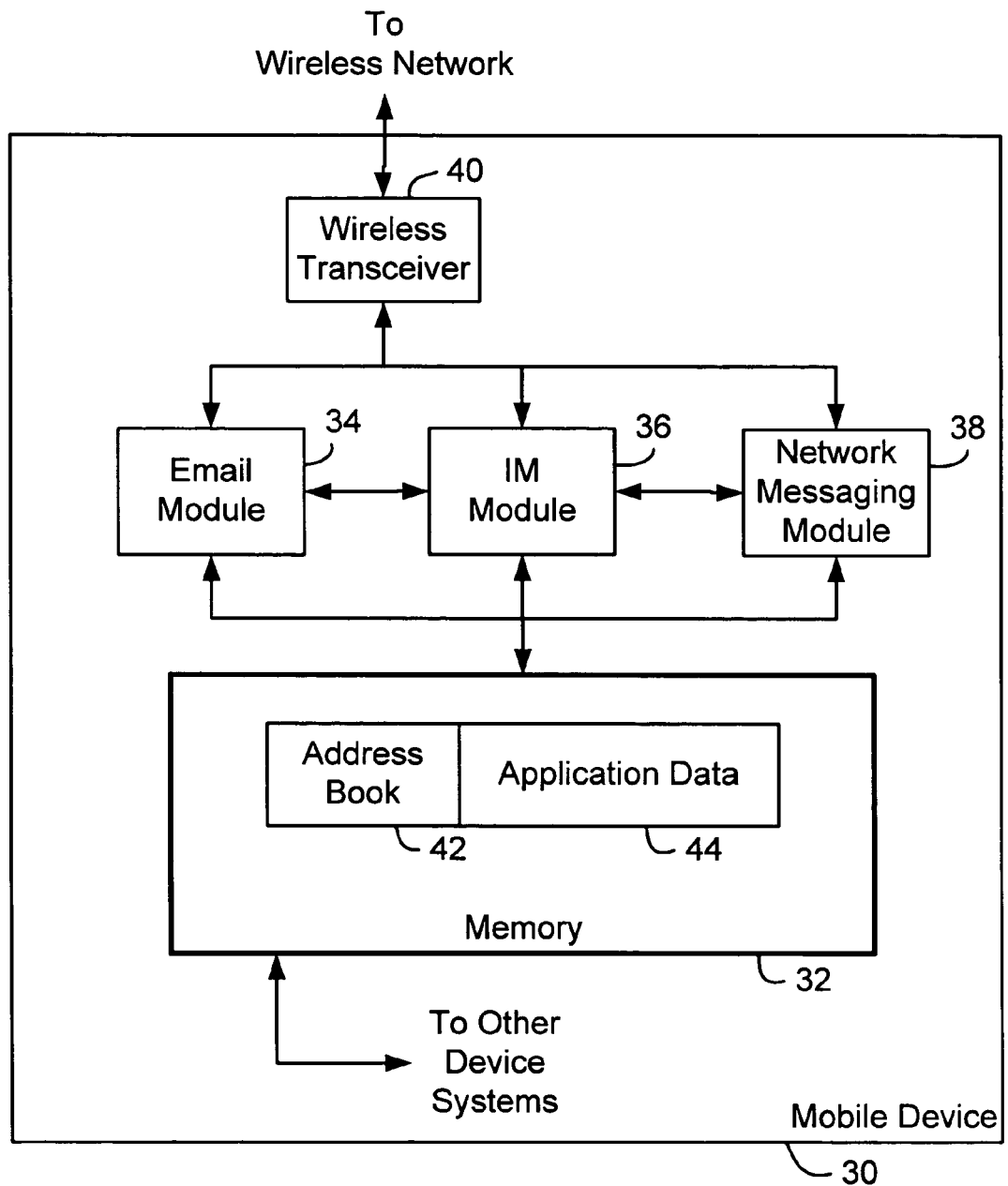
FIG. 2 is a block diagram of a wireless mobile communication device enabled for message transport selection.
FIG. 3 is a block diagram showing an exemplary address book entry that supports message transport selection according to an embodiment of the invention.

FIG. 2 is a block diagram of a wireless mobile communication device enabled for message transport selection. The mobile device 30 includes a memory 32, an email module 34, an IM module 36, a network messaging module 38, and a wireless transceiver 40, and represents one possible implementation of the mobile device 22 in FIG. 1.

The memory 32 is a writeable store such as a RAM into which other device components and systems may write data, and includes a storage area for an address book 42, and an application data storage area 44. The address book 42 stores contact information, at least some of which is preferably used by the messaging modules 34, 36, and 38 in messaging operations. Entries in such an address book are typically used for addressing outgoing messages, or to replace addressing information, such as an email address, in an outgoing or received message with a personal or familiar name from a corresponding address book entry. An address book entry can typically be created either manually, for example by inputting contact information or selecting an address from a received message using an input device (not shown), or automatically, such as by configuring a messaging module 34, 36, or 38 to store contact information when a message is received from a sender for which no entry exists in the address book 42. The application data store 44 stores data associated with software modules and applications on the mobile device 30. Data stored in the application data store 44 typically includes not only files and data that are processed by software applications, such as messages associated with the messaging modules 34, 36, and 38, but also configuration information. Each messaging module 34, 36, and 38 is connected to the memory 32 and enabled for read and/or write data access, depending upon the configuration of the mobile device 30.

The data stores 42 and 44 are illustrative examples of stores that may be implemented in the memory 32 on the mobile device 30. The memory 32 may also be used by other device systems in addition to those shown in FIG. 2, and used to store other types of data.

As shown in FIG. 2, the mobile device 30 includes a plurality of messaging modules, each associated with a message transport. Although each module operates in conjunction with hardware components of the mobile device 30, these modules are preferably implemented primarily in software that is executed by a processor (not shown) in the mobile device 30. The email module 34 is associated with an email transport, the IM module 36 is associated with an instant message transport, and the network messaging module 38 is associated with a network message transport. Referring to both FIGS. 1 and 2, the email module 34, the IM module 36, and the network messaging module 38 are configured to operate in conjunction with the email system 24, the IM system 26, and the network messaging system 20. In accordance with an aspect of the invention, a messaging module, the IM module 36 in FIG. 2, is a multiple-transport messaging module and is configured to determine whether any of the message transports is available, and if so, to select an available message transport to transmit a message from the mobile device 30 to a message recipient, as described in further detail below. Although each messaging module 34, 36, and 38 has an associated message transport, the IM module 36 can use either its associated message transport or another message transport.

The wireless transceiver 40 includes circuits and components required for communications within one or more wireless communication networks. Each of the messaging modules 34, 36, and 38 is connected to the wireless transceiver 40 and is thus enabled for communications via a wireless network or networks.

For email sending operations, a user of the mobile device 30 invokes the email module 34, and composes an outgoing message, such as a new message, a reply to a received message, or a forward message including a previously received or saved message. The outgoing message is addressed to one or more recipients either by the user, by selecting a recipient from the address book 42, for example, or by the email module 34 in the case of a reply message, formatted and encoded for the email message transport, preferably stored in a message store in the memory 32, and sent to the addressed recipients via the wireless transceiver 40 and a wireless network. Storage of outgoing messages not only provides a record of outgoing messages, but also permits the email module 34 to send outgoing messages at a later time, which is useful, for example, when the mobile device 30 is outside wireless network coverage when an outgoing message is ready to send.

The network messaging module 38 operates in a similar manner for network messages composed at the mobile device 30. Outgoing network messages are formatted and encoded for an associated network message transport, stored, and sent via the wireless transceiver 40 and a wireless network.

Initial message sending operations of the IM module 36 also involve the steps of composing and addressing an outgoing message. However, before an outgoing message is formatted and encoded for a particular transport, the IM module determines which message transports are available for the outgoing message. As long as the mobile device 30 maintains or can establish a connection to an IM system, an instant message transport is available, and is generally the preferred message transport for the IM module 36. When the mobile device is out coverage or operating in a voice network with limited data communication capabilities such as SMS, for example, the email and network message transports may be available, but the instant message transport is not available. In some circumstances, such as where the mobile device 30 is roaming outside a "home" network and incurs increased costs for wireless communications, other message transports that do not maintain a connection to a remote system may be preferred even when the instant message transport is available.

The determination of available message transports is made by the IM module 36 either during or after composition of an outgoing message. Since the availability of transports may change while a message is being composed, the determination is preferably made after the message has been composed, and the user selects or inputs a "send" or similar command. If the user is currently participating in an instant message exchange or "chat" with a remote user through an IM system and an existing connection to the IM system, then the IM module determines that the instant message transport is available as long as the mobile device 30 remains in coverage of a wireless data communication network. Wireless transceivers such as the transceiver 40 are typically enabled to identify the type of wireless networks to which it is currently connected or can establish a connection, or that it is out of coverage, and to provide an indication of connection state and availability. An indication that the mobile device 30 is currently operating within a GSM network allows the IM module 36 to determine that the instant message transport is not available, the email transport is available for store-and-forward message transmission, and the network message transport, SMS in this case, is available.

Once the IM module 36 determines which transports are available, one of the available transports is selected for transmitting the message. Where only one of the transports is available, then that transport is preferably selected. If more than one transport is available, however, the IM module 36 selects one of the transports. Selection of a transport is based on one or more factors, such as whether software to use an available transport is installed on the mobile device 30, whether the messaging module has been configured to use an available transport, the costs associated with sending a message using an available transport, a stored message transport preference associated with the recipient of the outgoing message, the type of transport via which messages were most recently received from a recipient of the outgoing message, whether the recipient is known to support the message transport, and whether the recipient is currently present at a particular location, if presence is associated with a message transport. For example, where all three transports represented in FIG. 2 are available, the SMS message transport might be selected based on a least cost criterion. In a similar situation in which an IM chat is in progress, the instant message transport may take precedence so that the chat is not interrupted by switching to a different transport. The particular selection criteria are preferably configurable by the user.

Those skilled in the art will appreciate that the steps of determination and selection need not necessarily be performed separately or in the order described above. In an alternative embodiment, determination and selection are effectively merged, so that availability of a transport becomes a selection criterion. In another alternative embodiment, all message transports with which the mobile device 30 is configured to operate are ranked based on selection criteria, availability is determined in order of rank, and the highest ranked available message transport is selected.

Available message transport determination and selection may be based on measured or calculated criteria such as wireless network connection state or cost, stored information associated with a recipient of an outgoing message, or both. FIG. 3 is a block diagram showing an exemplary address book entry that supports message transport selection according to an embodiment of the invention.

The address book entry 50 includes multiple contact information fields, for a first name 52, a last name 54, an email address 56, an IM user ID 58, a network messaging ID 60, and a device ID 62. An actual address book entry may contain more, fewer, or different fields than those shown in FIG. 3, and some fields in an address book entry may possibly be blank. For example, an address book entry for a contact for whom only a name and email address are known includes data in the fields 52, 54, and 56. Although this information is sufficient for addressing an email message using the email module 34 in FIG. 3, the IM module 36 and the network messaging module 38 may prompt a user for further addressing information if an outgoing instant message or network message is to be sent to the contact. The absence of information in one or more fields in an incomplete address book entry preferably does not preclude use of other populated fields in the address book entry, or use of functions normally associated with blank fields.

The content of fields 52 through 56 in the address book entry 50 will be apparent from the labels in FIG. 3. The IM user ID 58 provides address or identification information used by the IM module 36 for conventional IM operations. The network messaging ID 60 includes an address or identifier used by the network messaging module 38. For SMS, this field includes a telephone number. The device ID 62 represents an address or identifier for another possible message transport. As described above, the address book entry 50 is created automatically or manually, and once created, may be updated in a similar fashion. Where an email message is received from a contact for whom an incomplete address book entry already exists, for example, the email address for that contact may be either manually entered into the existing entry or automatically added to the existing entry by the email module 34.

In the above example of an outgoing instant message composed on the mobile device 30, the IM module 36 preferably accesses the entry 50 for the recipient of the instant message. Where an IM chat is in progress, the recipient of the instant message is already known to the IM module 36. Otherwise, the user selects the recipient from a list presented on a display screen by the IM module 36, or manually enters a recipient identifier or address. In the case of a manually entered recipient identifier or address, the IM module 36 preferably searches the address book 42 for an entry that contains the identifier or address.

Based on the populated fields in the address book entry, the IM module 36 determines whether any of the other message transports are available for the outgoing instant message. Where the fields for the email address 56, the network messaging ID 58, and the device ID 62 are blank or null, or no address book entry for the recipient is found in the address book 42, then the IM module 36 infers that no other transports have been configured for the instant message recipient, and as such are not available and should not be selected. If the instant message transport is also unavailable, then the instant message cannot be sent from the mobile device 30. In a preferred embodiment, the IM module 36 provides an error or failure indication to the user. The user may then update the address book entry for the recipient of the instant message or otherwise provide additional addressing or ID information to configure alternate message transports for the recipient.

Other contact-specific information, including message transport preferences or rankings and records of most recently used message transports, for example, may also be used in determining and selecting available message transports. Such further information is preferably stored in or referenced by address book entries in the address book 42.

Contact information for different messaging modules is typically stored and maintained in separate address books. For example, an email program on a computer system has an associated address book, whereas an instant messaging program on the same computer system has a separate so-called buddy list. Other messaging modules may similarly maintain corresponding address books or contact lists. Although an address book entry including contact information for different messaging modules and transports is shown in FIG. 3, the invention is in no way dependent thereon. A common address book used by multiple messaging modules facilitates the location of contact information for alternate message transports by any messaging module. Where multiple address books, contact lists, or stores for contact-specific message transport use and preference information are implemented, information, such as first and last name, that is common between the books, lists, and stores, or pointers between corresponding entries therein, allows a message module to locate all such information for a message recipient.

The IM module 36 is configured to select an available message transport for an outgoing message transport in accordance with predetermined, preferably user configurable, criteria as described above. In an alternate embodiment, final selection of a message transport is made by a user. The IM module 36 is configured to determine the availability of message transports and recommend a selection based on predetermined selection criteria, but message transport selection defers to user input. The user selects or indicates the available transport to be used for an outgoing message. Different degrees of user intervention in the selection process are also contemplated. For example, the user could be prompted to make a selection only when a message transport associated with a messaging module is not available.

Processing and transmission of an outgoing instant message is dependent upon the selected message transport. Where the instant message transport is selected, the instant message is suitably formatted and encoded by the IM module 36 and sent to an IM server via the wireless transceiver 40 and a wireless network. If an alternate transport is selected, however, the outgoing message is passed to the messaging module associated with the selected transport for formatting and encoding, storing to a message store in the memory 32, and transmission. The passing of a message between messaging modules is accomplished, for instance, by transferring the message from the IM module 36 to another messaging module, or by the IM module 36 first storing the message to a storage location in a message store in the memory 32, and then sending a command and an address of or pointer to the storage location in which the message is stored. In the latter case, the other messaging module retrieves the message from the storage location in the memory 32 instead of from the IM module 36.

On the mobile device 30, the outgoing instant message is preferably output to the user as a normal instant message, with the message text and possibly an indication that the user composed and sent the message. However, the outgoing instant message is not sent as a conventional instant message if an alternate message transport was selected. Although the recipient of the outgoing instant message receives an email or network message including the same text of the outgoing instant message, the message may appear differently at the mobile device 30 and the system or device on which the recipient views the message.

Figure 4:
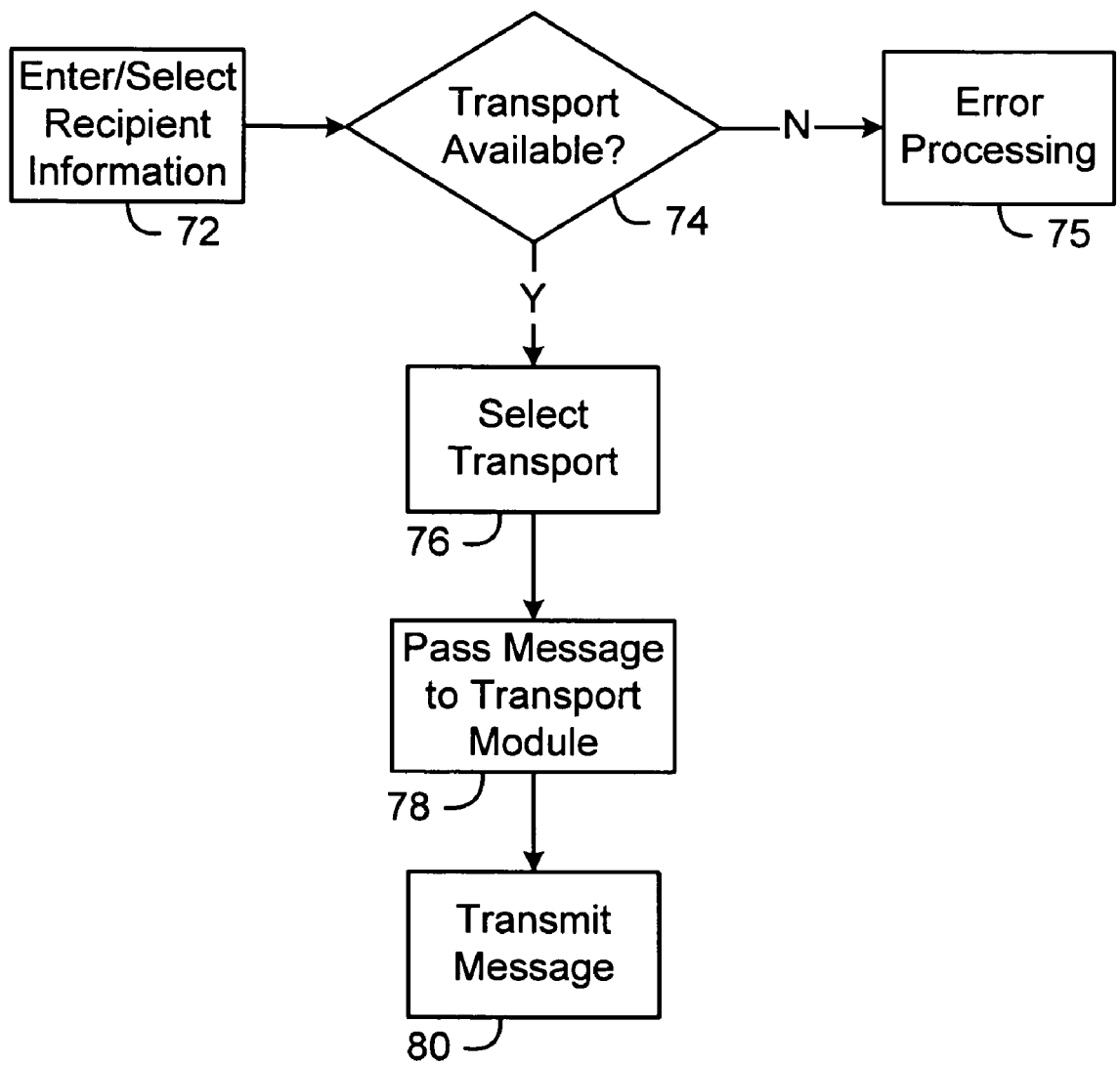
FIG. 4 is a flow chart illustrating a method of selecting a message transport.

The above operations are summarized in FIG. 4, which is a flow chart illustrating a method of selecting a message transport. At step 72, recipient information for an outgoing message that has been composed is entered or selected from an address book or contact list. The determination as to whether any message transports are available is then made at step 74, preferably after the outgoing message is ready to be sent. If no message transports are available, then error processing, such as outputting an error or failure indication to the user, is performed at step 75. Where a message transport is available, a transport is selected at step 76 based on selection criteria. As described above, the determination and selection at steps 74 and 76 may involve retrieving information stored in address books, contact lists, and contact-specific information stores for the recipient of the outgoing message.

After a message transport is selected at step 76, the method proceeds to step 78, in which the message is passed to the messaging module associated with the selected message transport, if necessary. That transport module formats, encodes, preferably stores, and then transmits the message at step 80 using the selected message transport.

FIG. 4 represents one embodiment of the present invention. Variations thereof will be apparent to those skilled in the art, and as such, are considered to be within the scope of the invention. For example, although shown as separate steps in FIG. 4, steps 74 and 76 may be merged into a combined operation. In addition, a composed message may be stored to memory in its original form before it is passed to another transport module at step 78.

Transmission of a message from a messaging module associated with a first message transport using a second message transport associated with a different messaging module has been described above. In accordance with another embodiment of the invention, a messaging module configured to operate in conjunction with other messaging modules and message transports also receives messages via the other transports.

Referring back to FIG. 2, the IM module 36 is connected to the email module 34 and the network messaging module 38. When an alternate message transport is selected for sending an outgoing instant message, the outgoing message is passed to the messaging module associated with the selected message transport for such transport-dependent processing as formatting and encoding, as described above, to generate a message having a type associated with the alternate transport. In a similar manner, incoming messages received at the mobile device 30 via a particular transport is decoded and possibly further processed by an associated messaging module. Instant messages received via an alternate message transport are detected by the messaging module associated with the alternate transport, either the email module 34 or the network messaging module 38, and then passed to the IM module for processing as an instant message. Receive operations are described in further detail below with reference to FIG. 5, which is a flow chart illustrating a method of receiving messages via multiple transports.

At step 82, a message is received via a message transport and passed to the corresponding messaging module. The messaging module then determines whether the received message is a "normal" message for that transport. This may be accomplished, for example, by examining a particular field in the received message or searching for a predetermined command, code, or string within the received message. In the case of an email message, an email module such as 34 in FIG. 2 may be configured to determine that the received message is an instant message when a subject line of the received message contains the text "instant message", or if the body of the message is shorter than some predetermined length and the message has no attachments and is addressed to a single recipient, for example. A received message having more than one recipient might also be characterized as an instant message where the recipients are participants in a current or previous instant message chat. Those skilled in the art will appreciate that other criteria may also or instead be applied at step 84.

Where the received message is a message type normally associated with the message transport, then the received message is processed in a normal fashion at step 86. In the mobile device 30, for example, email messages, instant messages, and network messages received over their respective associated transports are processed by the corresponding messaging modules 34, 36, and 38. As such, implementation of a messaging module enabled for message transport selection does not preclude normal operation of the multiple-transport messaging module or other messaging modules.

If the received message is not a normal message for the message transport over which it is received, as determined at step 84, then transport-dependent parts of the received message are processed at step 88. Step 88 includes such operations as decoding, for example. The received message may also be further processed by a receiving messaging module to strip away transport-dependent parts of the received message. At step 90, the processed message is passed to the messaging module, the IM module in the example of FIG. 5, that is configured to operate with multiple transports. The IM module then further processes the message as an instant message at step 92. Depending upon the configuration of each messaging module, the processing of an instant message at step 92 may involve further or different operations than the processing of an instant message at step 86. Where an instant message is received via an email transport, for example, stripping away "To", "Subject", and other email fields that are not normally part of an instant message might be performed at either step 88 or step 92.

In the embodiments described above, a messaging module is configured to operate in conjunction with other messaging modules to enable multiple message transports. Transport-dependent processing for outgoing and incoming messages for each message transport is performed by a corresponding messaging module. In an alternative embodiment, a multiple-transport messaging module is configured to perform processing associated with a plurality of message transports. This type of messaging module need not be connected to other messaging modules, and performs such transport-dependent processing as formatting and encoding for each message transport with which it is configured to operate. In reference to FIG. 2, an IM module configured in this manner need not be connected to the email module 34 or the network messaging module 38. In the embodiments described above, a multiple-transport messaging module is configured to operate in conjunction with other messaging modules and thus, indirectly, with other message transports, whereas in this alternate embodiment, a multiple-transport messaging module is configured to operate directly with multiple message transports.

Figure 5:
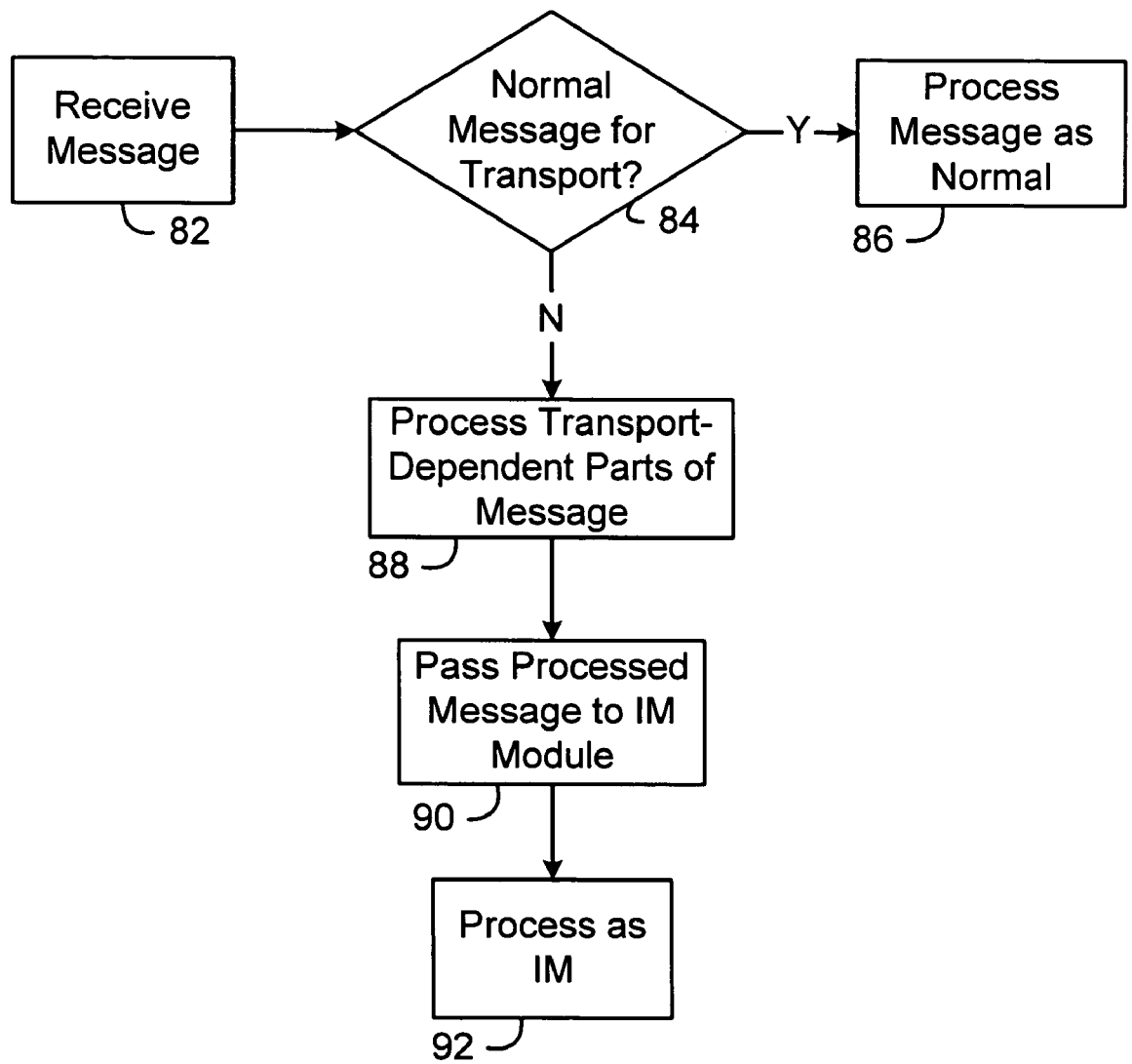
FIG. 5 is a flow chart illustrating a method of receiving messages via multiple transports.

Those skilled in the art will appreciate that this alternate embodiment may introduce some redundancy for transport-dependent processing. Redundancy is reduced, for example, by providing transport-dependent processing software components that can be invoked or called by any messaging module. Even where messaging modules incorporate redundant transport-dependent components, a multiple-transport messaging module according to this embodiment requires fewer, if any, modifications to existing messaging modules. Such a multiple-transport messaging module operates substantially independently of other messaging modules on a device while enabling use of the message transports associated with such other messaging modules. Messages are not passed between transports, and the processing operations at step 80 in FIG. 4 and steps 84, 88, and 92 in FIG. 5 are performed by the multiple-transport messaging module.

In an illustrative example of an IM module as a multiple-transport messaging module in a device that also includes an email module and a network messaging module, the IM module selects a message transport, then formats, encodes, and otherwise processes an outgoing instant message for the selected transport as necessary, and sends the outgoing instant message via the selected transport. The IM module also preferably monitors incoming messages to detect and process instant messages arriving via the email transport, the IM transport, or the network messaging transport. Detection of instant messages arriving by other transports may be based on a predetermined command, code, or string as described above.

Instant message detection based on a sender address or identifier may also be feasible, particularly where the IM module performs the detection. For example, if the IM module currently has an active email-based instant message exchange in progress with a particular recipient, then the IM module preferably detects incoming email messages from that recipient as instant messages. If a receiving messaging module is responsible for determining whether a message is a normal message for its associated transport, however, detection of instant messages based only on the sender may not be possible. Although the receiving messaging module may access an address book or list of contacts to determine whether the device has been configured for instant message exchange with the sender of a received message, the receiving module might not be able to distinguish between a normal message for its associated transport and an instant message sent over that transport using only sender information. In this case, the receiving module could be configured to detect received messages from senders configured for instant message exchange as instant messages, to prompt a user to choose between possible message types, or to access configuration settings to determine contact-specific instant message detection preferences or criteria, for example. Contact-specific preferences could be supported, for example, by configuring the IM module to update flags or fields in address book or buddy list entries when instant message exchanges are started or ended. Any messaging module then determines whether an instant message exchange is in progress with a sender of a received message by accessing a corresponding entry in the address book or buddy list.

According to another contemplated embodiment of the invention, received messages are written to a message store accessible to each messaging module as they are received. Each messaging module then accesses the message store, detects its own messages, and processes the messages accordingly. After processing a received message, a messaging module preferably stores a processed version of the message to the message store or another message store associated with the messaging module. Original received messages are then either maintained in the message store or deleted from the message store.

The systems and methods described herein provide for use of alternative message transports for messages that are typically associated with a particular message transport. However, it should be appreciated that sender and receiver processing are in no way interdependent. An instant message sent from a mobile device via an email transport may be processed as a normal email message at a recipient device or system. The recipient device or system need not even be enabled for message transport selection to receive messages from the mobile device. Similarly, even though a sender composes and transmits an email to a recipient, the email message may be processed and presented to the recipient as an instant message transmitted over an email transport.

Messaging modules are preferably implemented as software applications or components. As such, new message transports are enabled by installing supporting software and configuring required services on a communication device. For mobile devices, over-the-air provisioning provides a convenient means for directly obtaining new software and services. In a mobile device such as the device 30 in FIG. 2, the IM module 36 is configured to operate with a new messaging module in order to enable instant messages to be sent over a new message transport associated with the new messaging module.

Figure 6:
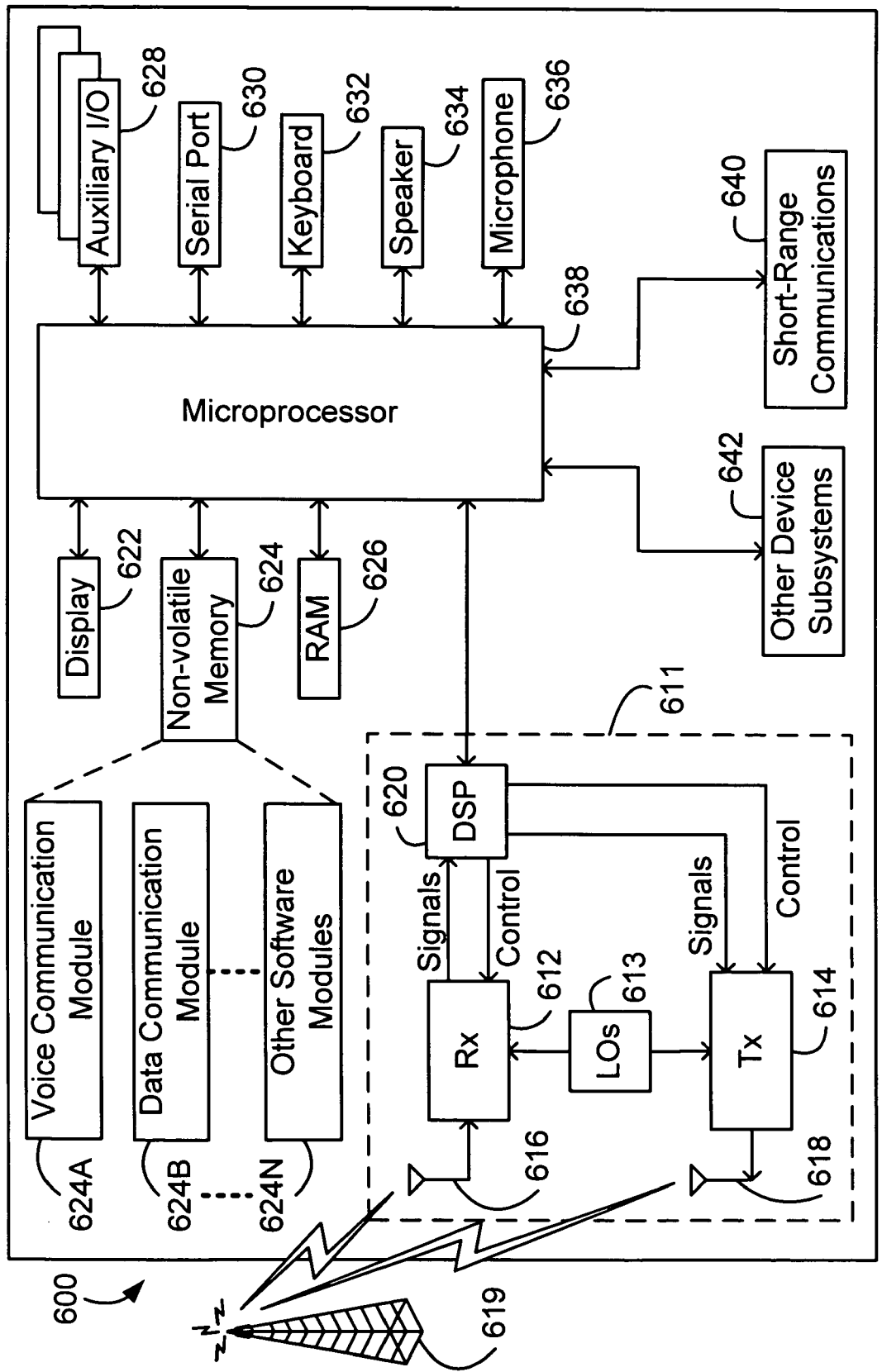
FIG. 6 is a block diagram of a wireless mobile communication device.

FIG. 6 is a block diagram of a wireless mobile communication device. The mobile device 600 is a two-way communication device having data and voice communication capabilities. The mobile device 600 preferably has the capability to communicate with other computer systems on the Internet. Depending on the functionality provided by the mobile device 600, it may be referred to as a data messaging device, a two-way pager, a cellular telephone with data messaging capabilities, a wireless Internet appliance or a data communication device (with or without telephony capabilities).

The dual-mode device 600 includes a transceiver 611, a microprocessor 638, a display 622, a non-volatile memory 624, a RAM 626, auxiliary input/output (I/O) devices 628, a serial port 630, a keyboard 632, a speaker 634, a microphone 636, a short-range wireless communications subsystem 640, and may also include other device sub-systems 642. The transceiver 611 includes transmit and receive antennas 616 and 618, a receiver (Rx) 612, a transmitter (Tx) 614, one or more local oscillators (LOs) 613, and a digital signal processor (DSP) 620. Within the non-volatile memory 624, the mobile device 600 preferably includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. In accordance with aspects of the invention described above, the data communication module 624B includes or is configured to operate in conjunction with a plurality of messaging modules.

As described above, the mobile device 600 is a two-way communication device having voice and data communication capabilities. Thus, for example, the mobile device 600 may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and the receiver 612, and may also exchange control information with the transmitter 614 and the receiver 612. If the voice and data communications occur at a single frequency, or closely-spaced set of frequencies, then a single LO 613 may be used in conjunction with the transmitter 614 and the receiver 612. Alternatively, if different frequencies are utilized for voice communications versus data communications, then a plurality of LOs 613 can be used to generate a plurality of frequencies corresponding to the network or networks 619. Although two antennas 616 and 618 are depicted in FIG. 6, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., is dependent upon the communication network(s) 619 in which the mobile device 600 is intended to operate. For example, a mobile device 600 intended to operate in a North American market may include a communication subsystem 611 designed to operate with the Mobitex or DataTAC mobile data communication networks and also with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600, as will be apparent to those skilled in the art.

Depending upon the type of network 619, the access requirements for the dual-mode mobile device 600 also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the network 619 are routed to the receiver 612, which provides for such operations as signal amplification, frequency down conversion, filtering, channel selection, and analog to digital conversion. Analog to digital conversion of the received signal allows more complex communication functions, including digital demodulation and decoding, for example, to be performed using the DSP 620. In a similar manner, signals to be transmitted to the network 619 are processed by the DSP 620 to modulate and encode the signals, for example, and the processed signals are then provided to the transmitter 614 for digital to analog conversion, frequency up conversion, filtering, amplification and transmission to the communication network 619 via the antenna 618. Although a single transceiver 611 is shown in FIG. 6 for both voice and data communications, the mobile device 600 may include two distinct transceivers, such as a first transceiver for transmitting and receiving voice signals, and a second transceiver for transmitting and receiving data signals, or multiple transceivers for operation in different operating frequency bands.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication functions are handled by the voice communication module 624A, the data communication module 624B, and possibly other modules 624N stored in the non-volatile memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619. On the mobile device 600, multiple messaging modules implemented either as part of or to operate in conjunction with the data communication module 624B are configured for message transport selection according to the techniques described above.

The microprocessor 638 also interacts with other device subsystems, such as the display 622, the non-volatile memory 624, the random access memory (RAM) 626, the auxiliary input/output (I/O) devices 628, the serial port 630, the keyboard 632, the speaker 634, the microphone 636, the short-range communications subsystem 640 and any other device subsystems generally designated as 642. The modules 624A-N are executed by the microprocessor 638 and provide a high-level interface between a user of the mobile device 600 and the mobile device. This interface typically includes a graphical component provided through the display 622, and an input/output component provided through the auxiliary I/O devices 628, the keyboard 632, the speaker 634, or the microphone 636.

Some of the subsystems shown in FIG. 6 perform communication-related functions, whereas other subsystems may provide "resident" or on-device functions. Notably, some subsystems, such as the keyboard 632 and the display 622 are used for both communication-related functions, such as entering a text message for transmission over a communication network 619, and device-resident functions such as a calculator or task list or other PDA-type functions.

Operating system software used by the microprocessor 638 is preferably stored in a persistent store such as the non-volatile memory 624. As those skilled in the art will appreciate, the non-volatile memory 624 may be implemented, for example, as a Flash memory device, a battery backed-up RAM, or a non-volatile memory chip and associated controller. Other suitable components or arrangements that provide data retention when power is lost will also be apparent to those skilled in the art. In addition to the operating system and communication modules 624A-N, the non-volatile memory 624 may also include a file system for storing data. The operating system, specific device applications or modules, or parts thereof, may be temporarily loaded into a volatile store such as RAM 626 for faster operation. Moreover, received communication signals may also be temporarily stored to RAM 626 before permanently writing them to a file system located in the non-volatile memory 624.

An exemplary software module 624N that may be loaded onto the dual-mode device 600 is a personal information manager (PIM) software application providing PDA functionality, such as calendar events, appointments, and task items. This module 624N may also interact with the voice communication module 624A for managing phone calls, voice mails, etc., and the data communication module 624B for managing e-mail communications and other data transmissions. Alternatively, all of the functionality of the voice communication module 624A and the data communication module 624B may be integrated into the PIM module. The non-volatile memory 624 preferably provides a file system to facilitate storage of PIM data items on the device. The PIM application preferably includes the ability to send and receive data items, either by itself or in conjunction with the voice and data communication modules 624A and 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to establish messaging settings through an external device or software application, to download other application modules 624N for installation, and to load digital certificates, cryptographic keys, and other information onto a device. This wired download path may be preferred, for example, to load an encryption key onto the device, since it typically provides a more secure method than exchanging encryption information via the wireless network 619.

Additional software modules 624N, including software modules associated with message transports, may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in software installation increases the functionality of the mobile device 600 and may provide enhanced on-device functions, communication-related functions, or both. For example, secure communication applications may enable electronic commerce functions and other such financial transactions to be performed using the mobile device 600, and further alternate message transports can be enabled by installing additional associated software modules, as described above.

When the mobile device 600 is operating in a data communication mode, a received signal, such as a text message or a web page download, is processed by the transceiver 611 and provided to the microprocessor 638, which further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of keyboards such as the known DVORAK style or telephone keypad may also be used. User input to the mobile device 600 is further enhanced with a plurality of auxiliary I/O devices 628, which may include a thumbwheel input device, a touchpad, a variety of switches, a rocker input switch, etc. The composed data items input by the user are then processed and transmitted over the communication network 619 via the transceiver 611.

When the mobile device 600 is operating in a voice communication mode, received signals are output to the speaker 634 and voice signals for transmission are generated by a microphone 636. Alternative voice or audio I/O subsystems, such as a voice message recording subsystem, may also be implemented on the mobile device 600. Although voice or audio signal output is accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

The short-range communications subsystem 640 may include, for example, an infrared device, an 802.11 module, a Bluetooth™ module, a Universal Serial Bus (USB) port, a Secure Digital (SD) port, and a smart card reader. Those skilled in the art will appreciate that "802.11" and "Bluetooth" refer to sets of specifications, available from the Institute of Electrical and Electronics Engineers, relating to wireless LANs and wireless personal area networks, respectively. The subsystem 640 provides further interfaces for transferring information to and from the mobile device 600, for such purposes as synchronizing the device with another system or device or loading software applications onto the device.

The above description relates to illustrative examples of the present invention. Many variations will be apparent to those knowledgeable in the field, and such variations are within the scope of the invention as described and claimed, whether or not expressly described.

For example, although a wireless mobile communication device is shown in FIG. 6 and described as one possible type of device to which message transport selection is applicable, the invention may also be implemented in other types of device, including desktop, laptop, and networked computer systems. In addition, although the mobile device of FIG. 6 is a dual-mode voice and data communication device, the message transport selection techniques described herein are applicable in data communication devices without voice communication functionality.

We claim:

1. A message transport selection system in a communication device, the system comprising:

a plurality of message transports, a plurality of messaging modules, each messaging module being associated with one of the plurality of message transports and being configured to format and encode an outgoing message for the associated message transport, the plurality of messaging modules comprising a multiple-transport messaging module further configured to:

provide for composition and addressing of an outgoing message by a user in association with a first message transport;

format and encode the composed outgoing message for each of the message transports associated with other messaging modules of the plurality of messaging modules;

determine whether any of the plurality of message transports is available for the composed outgoing message;

select one of the available message transports where any of the plurality of message transports is available; and send the composed outgoing message from the communication device using the selected message transport by storing the composed outgoing message to a storage location in a message store, sending a command and the storage location to one of the other messaging modules, the selected message transport being associated with this one of the other messaging modules, wherein each of the other messaging modules is further configured to retrieve the composed outgoing message from the message store, and to format, encode, and transmit the composed outgoing message upon receipt of the command.

2. The message transport selection system of claim 1, wherein the multiple-transport messaging module is associated with the instant messaging message transport.

3. The message transport selection system of claim 1, wherein the multiple-transport messaging module is further configured to select one of the available message transports in accordance with a predetermined order of precedence.

4. The message transport selection system of claim 1, further comprising an address book containing an entry associated with an intended recipient of the outgoing message, the address book entry comprising an identification for use by one or more messaging modules to encode the outgoing message for delivery to the intended recipient.

5. The message transport selection system of claim 4, wherein the multiple-transport messaging module determines that one of the plurality of message transports is available if the identification for use by the messaging module associated with that one of the plurality of message transports is present in the address book.

6. In a communication device comprising a plurality of messaging modules, each messaging module being associated with one of a plurality of message transports and being configured to format and encode an outgoing message for the associated message transport, the plurality of messaging modules comprising a multiple-transport messaging module further configured to determine whether any of the plurality of message transports is available, to select one of the available message transports where any of the plurality of message transports is available, and to send an outgoing message from the communication device using the selected message transport, a method of message transport selection comprising the steps of:

detecting a composed outgoing message to be sent from the communication device, the outgoing message being of a message type associated with one of the plurality of message transports;

determining, using the multiple-transport messaging module, which of the plurality of message transports is available;

selecting, using the multiple-transport messaging module, one of the available message transports wherein the selected message transport is different than the message transport associated with the message type of the detected outgoing message;

formatting and encoding the outgoing message for the selected available message transport;

sending the outgoing message from the communication device using the selected message transport;

receiving a message over one of the plurality of message transports;

determining whether the message transport over which the message was received was an alternate message transport for the received message by searching the message for a predetermined command, code, or string; and processing the received message as a message type associated with another of the plurality of message transports where the message transport over which the message was received was an alternate message transport for the received message.

7. A computing device program product comprising code operative to perform the method of claim 6.

* * * * *